(12) United States Patent
Yi et al.

(10) Patent No.: US 8,139,555 B2
(45) Date of Patent: Mar. 20, 2012

(54) BI-DIRECTIONAL PACKET DATA TRANSMISSION SYSTEM AND METHOD

(75) Inventors: Seung-June Yi, Seoul (KR); Young-Dae Lee, Gyeonggi-Do (KR); So-Young Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 840 days.

(21) Appl. No.: 12/078,788

(22) Filed: Apr. 4, 2008

(65) Prior Publication Data

US 2008/0186947 A1 Aug. 7, 2008

Related U.S. Application Data

(63) Continuation of application No. 10/640,575, filed on Aug. 14, 2003, now Pat. No. 7,366,105.

(30) Foreign Application Priority Data

Aug. 14, 2002 (KR) .................. 2002-48261

(51) Int. Cl.
*H04J 3/24* (2006.01)
(52) U.S. Cl. ...................................... 370/349
(58) Field of Classification Search ............ 370/349
See application file for complete search history.

(56) References Cited

U.S. PATENT DOCUMENTS

| | | | |
|---|---|---|---|
| 6,016,311 A | 1/2000 | Gilbert et al. | |
| 6,300,887 B1 | 10/2001 | Le | |
| 6,334,057 B1 | 12/2001 | Malmgren et al. | |
| 6,438,108 B1 | 8/2002 | Kanljung et al. | |
| 6,490,271 B1 | 12/2002 | Erjanne | |
| 6,611,535 B2 | 8/2003 | Ljungqvist | |
| 6,751,209 B1 | 6/2004 | Hamiti et al. | |
| 7,009,936 B1 | 3/2006 | Kangas et al. | |
| 7,035,287 B2 | 4/2006 | Tourunen et al. | |
| 7,453,847 B2 | 11/2008 | Wallentin et al. | |
| 2001/0022784 A1 | 9/2001 | Menon et al. | |
| 2002/0001298 A1 | 1/2002 | Tourunen et al. | |
| 2002/0018010 A1 | 2/2002 | Le | |
| 2002/0038385 A1* | 3/2002 | Kalliokulju ................. 709/247 |

(Continued)

FOREIGN PATENT DOCUMENTS

CN 1282493 1/2001

(Continued)

OTHER PUBLICATIONS

Masugi Inoue et al., "ABR Message Transfer Schemes in Wireless ATM Networks," Personal, Indoor and Mobile Radio comunications, 1996. PIMRC'96, Seventh IEEE International Symposium, vol. 2, Oct. 15-18, 1996, pp. 608-612.

(Continued)

*Primary Examiner* — Jeffrey Pwu
*Assistant Examiner* — Farhad Ali
(74) *Attorney, Agent, or Firm* — McKenna Long & Aldridge LLP

(57) ABSTRACT

A bi-directional packet data transmission system for a packet data transmission between a terminal and a radio access network includes an uplink resource and a downlink resource which are independently set. Memory resources can be effectively managed even in a packet data transmission service with the asymmetrical structure such that the packet amount for the downlink is much greater than the packet amount for the uplink, or the packet amount for the uplink is much greater than the packet amount for the downlink.

2 Claims, 7 Drawing Sheets

U.S. PATENT DOCUMENTS

| | | |
|---|---|---|
| 2002/0064164 A1 | 5/2002 | Barany |
| 2002/0091860 A1 | 7/2002 | Kalliokulju et al. |
| 2002/0141371 A1 | 10/2002 | Hsu |
| 2002/0191556 A1 | 12/2002 | Krishnarajah et al. |
| 2005/0195750 A1 | 9/2005 | Le et al. |

FOREIGN PATENT DOCUMENTS

| | | |
|---|---|---|
| EP | 1 130 800 A2 | 9/2001 |
| EP | 1130800 | 9/2001 |
| JP | 2001-267996 | 9/2001 |
| JP | 2001-523931 | 11/2001 |
| WO | WO 98/37696 A1 | 8/1998 |
| WO | WO 01/50705 | 7/2001 |
| WO | WO 02/25895 | 3/2002 |

OTHER PUBLICATIONS

Yong Bai et al., "TCP Over Asymmetric CDMA Radio Links," Vehicular Technology Conference, 2000, IEEE VTS-Fall VTC 2000, 52nd, vol. 3, Sep. 24-28, 2000, pp. 1015-1018.

Magnus Lindstrom, "Improved TDD Resource Allocation Through Inter-Mobile Interference Avoidance," Vehicular Technology Conference 2001, VTC 2001 Spring, IEEE VTS 53rd, vol. 2, May 6-9, 2001, pp. 1027-1031, vol. 2.

Takahiro Shoiji et al., "Dedicated Priority Function SEG for TD-CDMA Cellular System," Vehicular Technology Conference, 2000, IEEE VTS-Fall VTC 2000, 52nd, vol. 4, Sep. 24-28, 2000, pp. 1784-1788.

RFC-2507, "IP Header Compression", IETF, M. Degermark, et al., Feb. 1999, pp. 7-13, "3. Compression Method".

RFC-3095, "Robust Header Compression (ROHC): Framework and four profiles: RTP, UDP, ESP, and uncompressed", IETF, C. Bormann et al., Jul. 2001 pp. 1-2, "Abstract".

"$3^{rd}$ Generation Partnership Project; Technical Specification Group Radio Access Network; Radio Access Bearer Support Enhancements" 3GPP TR 25.844 V2.0.0, Mar. 1, 2001, pp. 1-27.

* cited by examiner

BI-DIRECTIONAL PACKET DATA TRANSMISSION SYSTEM AND METHOD

This application is a continuation of U.S. application Ser. No. 10/640,575, filed on Aug. 14, 2003 now U.S. Pat. No. 7,366,105, which claims the benefit of the Korean Application No. P2002-48261, filed on Aug 14, 2002, which are both hereby incorporated by reference for all purposes as if fully set forth herein.

BACKGROUND OF THE INVENTION

1. Field of the Invention

The present invention relates to a packet data transmission and, more particularly, to a packet data transmission method and system of a mobile communication system.

2. Discussion of the Related Art

Recently, a mobile communication system has seen a remarkable development, but in terms of a large capacity data communication service, it is much behind the cable communication system. Countries throughout the world are developing a technique of IMT-2000 and actively cooperating for standardization of the technique.

A universal mobile telecommunications system (UMTS) is a third generation mobile communication system that has evolved from a standard known as Global System for Mobile communications (GSM). This standard is a European standard which aims to provide an improved mobile communication service based on a GSM core network and wideband code division multiple access (W-CDMA) technology.

In December, 1998, the ETSI of Europe, the ARIB/TTC of Japan, the T1 of the United States, and the TTA of Korea formed a Third Generation Partnership Project (3GPP) for the purpose of creating the specification for standardizing the UMTS.

The work toward standardizing the UMTS performed by the 3GPP has resulted in the formation of five technical specification groups (TSG), each of which is directed to forming network elements having independent operations.

More specifically, each TSG develops, approves and manages a standard specification in a related region. Among them, a radio access network (RAN) group (TSG-RAN) develops a specification for the function, items desired, and interface of a UMTS terrestrial radio access network (UTRAN), which is a new RAN for supporting a W-CDMA access technology in the UMTS.

FIG. 1 illustrates an example of the construction of a general UMTS network. As shown in FIG. 1, the UMTS is roughly divided into a terminal, UTRAN 100 and a core network 200.

The UTRAN 100 includes one or more radio network sub-systems (RNS) 110 and 120. Each RNS 110 and 120 includes a radio network controller (RNC) 111 and plural Node Bs 112 and 113 managed by the RNC 111. The RNC performs functions which include assigning and managing radio resources, and operates as an access point with respect to the core network 200.

Node Bs 112 and 113 receive information sent by the physical layer of the terminal through an uplink, and transmit data to the terminal through a downlink. The Node Bs 112 and 113, thus, operate as access points of the UTRAN for the terminal.

The core network 200 includes a mobile switching center (MSC) 210 and a gateway mobile switching center (GMSC) 220 for supporting a circuit switched service, and a serving GPRS support node (SGSN) 230 and a gateway GPRS support node 240 for supporting a packet switched service.

The services provided to a specific terminal is roughly divided into the circuit switched service and the packet switched service. For example, a general voice phone call service belongs to the circuit switched service, while a Web browsing service through an Internet connection is classified as the packet switched service.

In case of supporting the circuit switched service, the RNC 111 is connected to the MSC 210 of the core network 200, and the MSC 210 is connected to the GMSC 220 managing a connection to other networks.

Meanwhile, in case of supporting the packet switched service, the RNC 111 provides a service in association with the SGSN 230 and the GGSN 240 of the core network 200. The SGSN 230 supports a packet communication going toward the RNC 111, and the GGSN 240 manages connection to other packet switched network such as the Internet network.

Various interfaces exist between network components to allow the network components to give and take information to and from each other for a mutual communication. An interface between the RNC 111 and the core network 200 is defined as an Iu interface. Especially, an Iu interface between packet switch-related systems of the RNC 111 and the core network 200 is defined as an Iu-PS, and an Iu interface between circuit switch-related systems of the RNC 111 and the core network 200 is defined as an Iu-CS.

FIG. 2 illustrates a structure of a radio interface protocol between the terminal and UTRAN 100 according to the 3GPP radio access network standards.

As shown in FIG. 2, the radio interface protocol is vertically divided into a physical layer, a data link layer and a network layer, and is horizontally divided into a user plane (U-plane) for transmitting data signal and a control plane (C-plane) for transmitting a control signal.

The user plane is a region handling traffic information of a user such as a voice signal or an IP packet, while the control plane is a region handling control information such as an interface of a network or maintenance and management of a call.

In FIG. 2, protocol layers can be divided into a first layer (L1), a second layer (L2), and a third layer (L3) based on three lower layers of an open system interconnection (OSI) standard model.

Functions of each protocol layer of FIG. 2 will now be described.

The first layer (L1), that is, the physical layer, provides an information transfer service to a higher layer by using various radio transfer techniques.

The physical layer is connected to the MAC layer, a higher layer, through a transport channel, and the MAC layer and the physical layer transfer signals through the transport channel.

The second layer (L2) includes: an MAC layer, a radio link control (RLC) layer and a packet data convergence protocol (PDCP) layer.

The MAC layer provides a re-allocation service of the MAC parameter for allocation and re-allocation of radio resources.

The MAC layer is connected to the radio link control (RLC) layer through a logical channel, and various logical channels are provided according to the kind of transmitted information.

In general, when information of the control plane is transmitted, a control channel is used. When information of the user plane is transmitted, a traffic channel is used.

The RLC layer supports a reliable data transmission and performs functions of segmentation and reassembly of an RLC service data unit (SDU) received from an upper layer.

When the RLC SDU is received from the higher layer, the RLC layer controls a size of each RLC SDU to be suitable to a process capacity, and adds header information thereto to generate a certain data unit. The thusly generated data unit is referred to as a protocol data unit (PDU) which is transferred to the MAC layer. The RLC layer includes an RLC buffer for storing the RLC SDU or the RLC PDU.

The packet data convergence protocol (PDCP) layer is a higher layer of the RLC layer. A data transmitted through a network protocol such as an IPv4 (internet Protocol version 4) or an IPv6 (internet Protocol version 6) can be transmitted effectively on a radio interface with a relatively small band width by virtue of the PDCP layer.

For this purpose, the PDCP layer performs a function of reducing unnecessary control information used in the cable network, which is called a header compression, for which header compression schemes such as an RFC2507 or an RFC3095 (Robust Header Compression (ROHC)) defined by an Internet standardization group called an IETF (Internet Engineering Task Force) are used.

In these schemes, only information requisite for a header part of a data is transmitted, thereby reducing an amount of data to be transmitted. That is, unnecessary fields of the header are removed or a size of the header fields is reduced to reduce the amount of data of the header part.

An RRC (Radio Resource Control) layer is positioned at the lowest portion of the third layer. The RRC layer is defined only in the control plane and controls the transport channels and the physical channels in relation to the setup, the reconfiguration and the release of the radio bearers (RBs).

The RB service signifies a service provided by the second layer for data transmission between the terminal and UTRAN, and setting up of the RB means processes of stipulating the characteristics of a protocol layer and a channel, which are required for providing a specific service, and setting the respective detailed parameters and operation methods.

For reference, the RLC layer can be included in the user plane or in the control plane depending on which layer is connected at an upper position. If the RLC layer receives data from the RRC layer, the RLC layer belongs to the control plane, and otherwise, the RLC layer belongs to the user plane.

As shown in FIG. 2, in case of the RLC layer and the PDCP layer, a plurality of entities can exist in one layer. This is because one terminal has a plurality of RBs, and generally one RLC entity (or only one PDCP entity) is used for one RB.

FIG. 4 is a signal flow chart for implementing the header compression scheme in accordance with a conventional art, and FIG. 5 illustrates a structure of a compressor and decompressor of the terminal and UTRAN.

An IP header compression scheme of the PDCP layer will now be described with reference to FIGS. 4 and 5.

First, referring to the RFC2507, different compression schemes are used depending on whether an upper protocol of the IP layer is TCP or not. That is, if an upper protocol of the IP layer is UDP, a compression scheme called 'compressed non-TCP' is used whereas if the upper protocol of the IP layer is TCP, a compression scheme called 'Compressed TCP' is used. The Compressed TCP is classified into a 'Compressed TCP' and a 'Compressed TCP nodelta' depending on a transmission method of a varied header field.

The 'Compressed TCP' scheme is a method that on the basis of the fact that variable header field values are not much different from each other among successive packets, only a difference between header fields values is transmitted, rather than transmitting the overall field value. Meanwhile, the 'Compressed TCP nodelta' scheme is a method of transmitting the overall varied field value as it is.

In the case of the 'Compressed TCP' scheme, a transmitting party first transmits an overall header packet for one packet stream to constitute a context both in the transmitting party and in a receiving party, and then uses a compression header indicating the difference from a previous packet to transmit the next packets. Meanwhile, the 'Compressed TCP nodelta' scheme is that the overall header field value as varied is transmitted.

Likewise, in the 'Compressed Non-TCP' scheme, the transmitting party first transmits an overall header packet for one packet stream to constitute a context both in the transmitting party and the receiving party, and transmits an overall header field value formed as a variable field for the next packets.

However, the 'Compressed Non-TCP' header compression scheme can be used for a uni-directional communication and adopts a compression slow-start method which transmits overall header information at exponentially increasing intervals. In the compression slow-start method, if the overall header information is changed or if a new header compression scheme is adopted, the same overall header is frequently transmitted at an initial stage and then a transmission interval is gradually widened. FIG. 3 shows a concept of the compression slow-start method.

Parameters constituting the forms of the compressor and the decompressor should be defined to use the RFC2507 header compression scheme at the PDCP layer.

Defined in the RFC2507 header compression scheme are an F_MAX_PERIOD parameter indicating the number of compressed Non-TCP header packets transmittable between full header packets transmitted exponent-repeatedly in the compression slow-start method, an F_MAX_TIME parameter indicating a compressed header packet transmission time between a time point when the latest full header packet has been transmitted and a time point when the next full header packet is to be transmitted, an MAX_HEADER parameter indicating the maximum size of a header usable for the header compression scheme, a TCP_SPACE parameter indicating the maximum number of contents usable for the 'Compressed TCP' scheme, a NON_TCP_SPACE parameter indicating the maximum number of contents used for the 'Compressed Non-TCP' scheme, and an EXPECTED_RECORDING parameter indicating whether re-sequential array is supported. The F_MAX_TIME parameter is used to inform a repetition period of the full header packet (refer to FIG. 1).

The parameters are used to construct forms of the compressors 512 and 522 and the decompressors 511 and 521 of the terminal 410 and UTRAN 420 and defined in RFC2507, an IETF document of the RFC2507 header compression scheme.

TABLE 1

| Information Element/Group name | Type and reference | Semantics description |
|---|---|---|
| >>>F_MAX_PERIOD | Integer (1 ... 65535) | Largest number of compressed non-TCP headers that may be sent without sending a full header. Default value is 256. |
| >>>F_MAX_TIME | Integer (1 ... 255) | Compressed headers may not be sent more than F_MAX_TIME seconds after sending last full header. Default value is 5. |
| >>>MAX_HEADER | Integer (60 ... 65535) | The largest header size in octets that may be compressed. Default value is 168. |
| >>>TCP_SPACE | Integer (3 ... 255) | Maximum CID value for TCP connections. Default value is 15. |
| >>>NON_TCP_SPACE | Integer (3 ... 65535) | Maximum CID value for non-TCP connections. Default value is 15. |
| >>>EXPECT_REORDERING | Enumerated (reordering not expected, reordering expected) | Whether the algorithm shall reorder PDCP SDUs or not. Default value is "reordering not expected". |

The header compression and decompression process adopting the RFC2507 header compression scheme will now be described.

First, the RRC layer 411 of the terminal 10 transfers capacity information to the RRC layer 421 of UTRAN 420. Then, the RRC layer 421 of UTRAN 420 allocates a memory resource required for header compression by referring to the capacity information. That is, the RRC layer 421 sets parameter values forming the compressors 512 and 522 and the decompressors 511 and 521.

For example, F_MAX_PERIOD is set to 256, F_MAX_TIME is set to 5, MAX_HEADER is set to 168, and NON_TCP_SPACE is set to 15.

When the parameter values are all set, the RRC layer 421 of UTRAN 420 transfers the set parameter values to the RRC layer 411 of the terminal 410.

As the parameter values reach the terminal 410, the RRC layer 411 of the terminal 410 and the RRC layer 421 of UTRAN 420 respectively transfer the set parameter values to respective PDCP layers 412 and 422. Then, a header compression performing layer included in the PDCP layers 412 and 422 forms the compressors 512 and 522 and the decompressors 511 and 521 on the basis of the received parameter values.

The ROHC (Robust Header Compression) scheme will now be described.

The ROHC scheme is commonly used to reduce header information of an RTP(Real-time Transport Protocol)/UDP (User Datagram Protocol)/IP(Internet Protocol) packet. The RTP/UDP/IP packet, which means a packet with RTP, UDP and IP related headers which have been added to a user data while passing each layer, includes various header information required for transmitting data to a destination through the Internet.

The ROHC scheme is a header compression scheme based on the fact that each field value of packet headers of sequential packets belonging to one packet stream is almost the same. Thus, in the ROHC scheme, not the entire packet header field is transmitted but a variable field is transmitted.

For reference, an overall size of the header of the RTP/UDP/IP packet is 40 octet in case of IPv4 (Internet Protocol version 4) and 60 octet in case of IPv6 (internet Protocol version 6). Meanwhile, a pure data part (payload) usually has a size of 15-20 octet. That is, because the amount of control information is much greater than the amount of data to be actually transmitted, a transmission efficiency is quite low. Therefore, using the header compression schemes ensures a high transmission efficiency because the amount of control information is much reduced (in case of using the ROHC scheme, the size of the header is reduced by about 1 octet to 3 octet).

Like the RFC2507 header compression scheme, in order to use the ROHC scheme at the PDCP layer, parameters constituting the form of the compressor and the decompressor should be defined.

Parameters defined for the ROHC scheme includes a Max_CID parameter informing of the maximum number of contexts usable in the compressor, a profile parameter indicating what is the type of the IP packet used for a corresponding packet stream among RTP/UDP/IP, UDP/IP and ESP/IP, an MRRU (Maximum Reconstructed Reception Unit) parameter indicating whether an IP should be segmented and also indicating the maximum size of segments when they are reassembled after being segmented in the decompressor, a Packet_Sized_Allowed parameter informing of a size of a compression header packet supportable by the ROHC scheme, and a Reverse_Decompression_Depth parameter indicating whether a compressed packet has been re-attempted for decompression after the decompressor had failed to decompress it, and determining the number of re-attempts of decompression. These parameters are defined in the RFC3095, the IETF document of the ROHC scheme.

The header compression and decompression process adopting the ROHC scheme is the same as those of the RFC2507 header compression scheme as described above (refer to FIGS. 4 and 5).

For a communication to an uplink, the compressor 512 of the terminal 410 and the decompressor 521 of UTRAN 420 should have the same form, and for a communication to a downlink, the compressor 522 of UTRAN 420 and the decompressor 511 of the terminal 410 also should have the same form.

Because, the RRC layer 421 of UTRAN 420 sets the parameter values to form the compressor and the decompressor without discrimination of the uplink and the downlink, the compressors 512 and 522 and the decompressors 511 and 521 provided in the terminal 410 and UTRAN 420 have all the same forms.

In order to effectively provide a VoIP service and a streaming service and prevent consumption of radio resources, the UMTS system adopts the header compression scheme such as the RFC2507 header compression scheme or the ROHC scheme to compress a header from the original size of 40 bytes or 60 bytes to a size of 1-4 bytes and transmit it. For this purpose, the terminal 410 and UTRAN 420 should define parameters for forming the compressor and the decompressor.

Usually, the UMTS system also provides the streaming service in which the uplink and the downlink are asymmetrical as well as the VoIP service in which the uplink and the downlink are symmetrical.

In this respect, however, the RRC layers 411 and 421 and the PDCP layers 412 and 422 sets a memory resource in consideration of only the transmission service in the uplink and downlink-symmetrical structure such as the VoIP (Voice over IP), so that the compressor and decompressor 512 and 521 of the uplink and the compressor and the decompressor 522 and 511 of the downlink have the same forms.

A problem of the conventional bi-directional packet data transmission system lies in that, the UMTS system allocates the same header compression-related memory resource to the uplink and the downlink even for the packet data transmission of the asymmetrical structure such as the streaming service.

The streaming service is a downlink-oriented service in which a packet data for a service requested by a user is transmitted through the downlink while reception information for the transmitted packet data is fed back through the uplink.

In terms of characteristics of the streaming service, the amount of the packet data transmitted to the downlink is much greater than the amount of packet data transmitted to the uplink. Thus, the conventional bi-directional packet data transmission system is disadvantageous that the memory resources used for the header compression scheme are unnecessarily wasted and thus efficiency of the resources is degraded.

The above references are incorporated by reference herein where appropriate for appropriate teachings of additional or alternative details, features and/or technical background.

SUMMARY OF THE INVENTION

Accordingly, the present invention is directed to a bi-directional packet data transmission system and method that substantially obviates one or more problems due to limitations and disadvantages of the related art.

An advantage of the present invention is a bi-directional packet data transmission system and method capable of asymmetrically setting an uplink memory resource and a downlink memory resource.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof, as well as the appended drawings.

To achieve these and other advantages and in accordance with the purpose of the invention, as embodied and broadly described herein, there is provided a bi-directional packet data transmission system for a packet data transmission between a terminal and a radio access network, in which an uplink resource and a downlink resource are independently set.

Preferably, the resource is a memory resource.

Preferably, the memory resource is related to header compression.

Preferably, the memory resource has parameters required for header compression and decompression.

Preferably, an RRC layer of the radio access network sets resources to be different for uplink transmission and downlink transmission.

Preferably, a PDCP layer of the terminal forms a compressor by referring to received parameter values of the uplink and a decompressor by referring to received parameter values of downlink, and performs header compression and decompression.

Preferably, a PDCP layer of the radio access network forms a decompressor by referring to received parameter values of the uplink and a compressor by referring to received parameter values of downlink, and performs header compression and decompression.

In another aspect of the present invention, there is further provided a bi-directional packet data transmission system for a packet data transmission between a terminal and a radio access network, including: setting an uplink resource and a downlink resource to be different; transferring the set resource to each PDCP layer of a terminal and a radio access network; and asymmetrically performing uplink and downlink transmission by using the received resource.

Preferably, in the resource setting step, parameters required for header compression and decompression are determined and sizes of the parameters are set.

Preferably, the asymmetrical transmission performing step includes: forming a compressor by referring to the received parameter values of uplink and a decompressor by referring to the received parameter values of downlink; and performing a packet transmission according to a header compression scheme by using the compressor and the decompressor.

Preferably, the asymmetrical transmission performing step includes: forming a decompressor by referring to the received parameter values of uplink and a compressor by referring to the received parameter values of downlink; and performing a packet transmission according to a header compression scheme by using the compressor and the decompressor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 7:
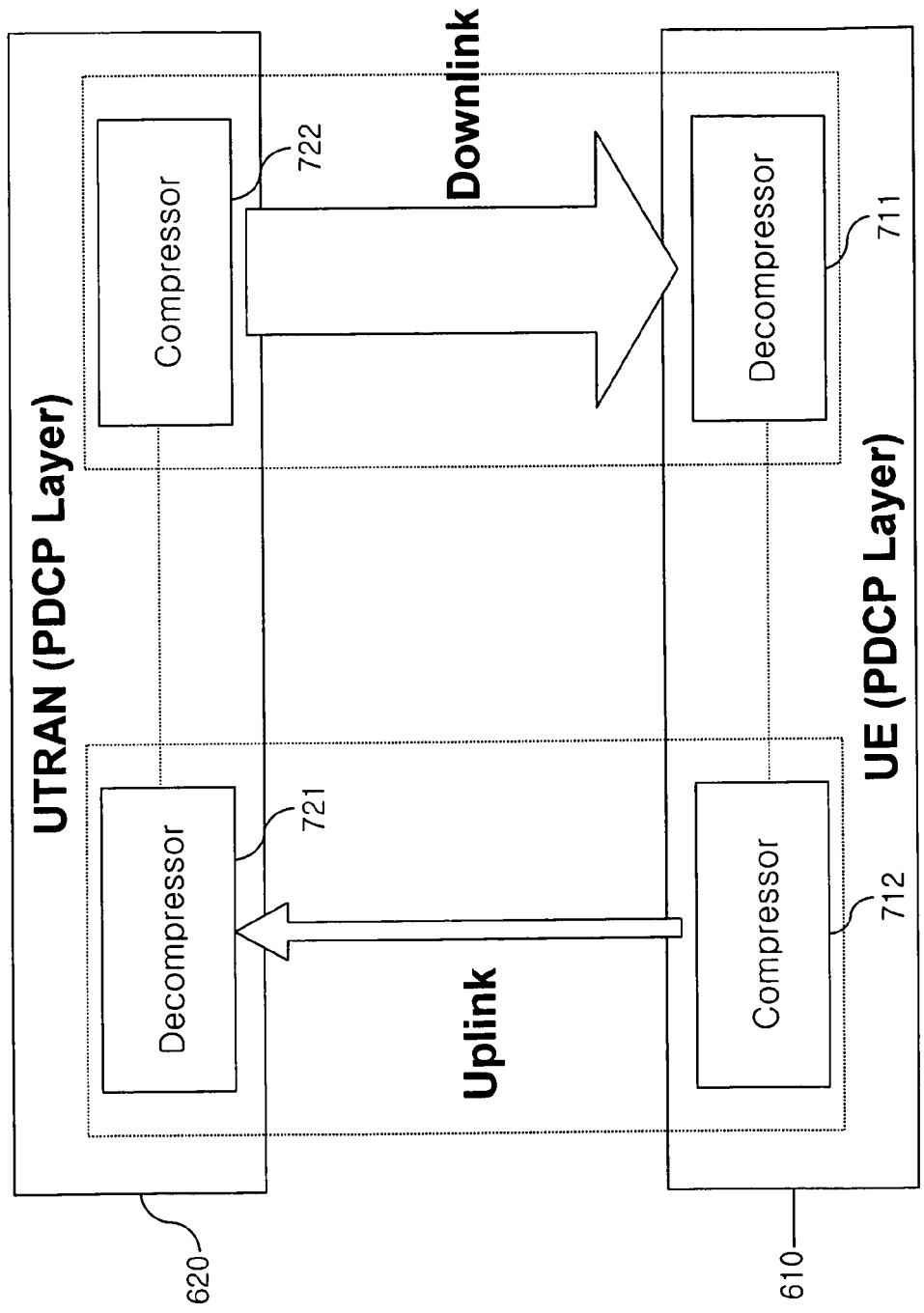
FIG. 7 illustrates structures of compressors and decompressors of a terminal and UTRAN in accordance with the preferred embodiment of the present invention.

FIG. 7 illustrates structures of compressors and decompressors of a terminal or mobile unit and UTRAN in accordance with the preferred embodiment of the present invention and shows transmission in an asymmetrical structure between an uplink and a downlink.

Figure 1:
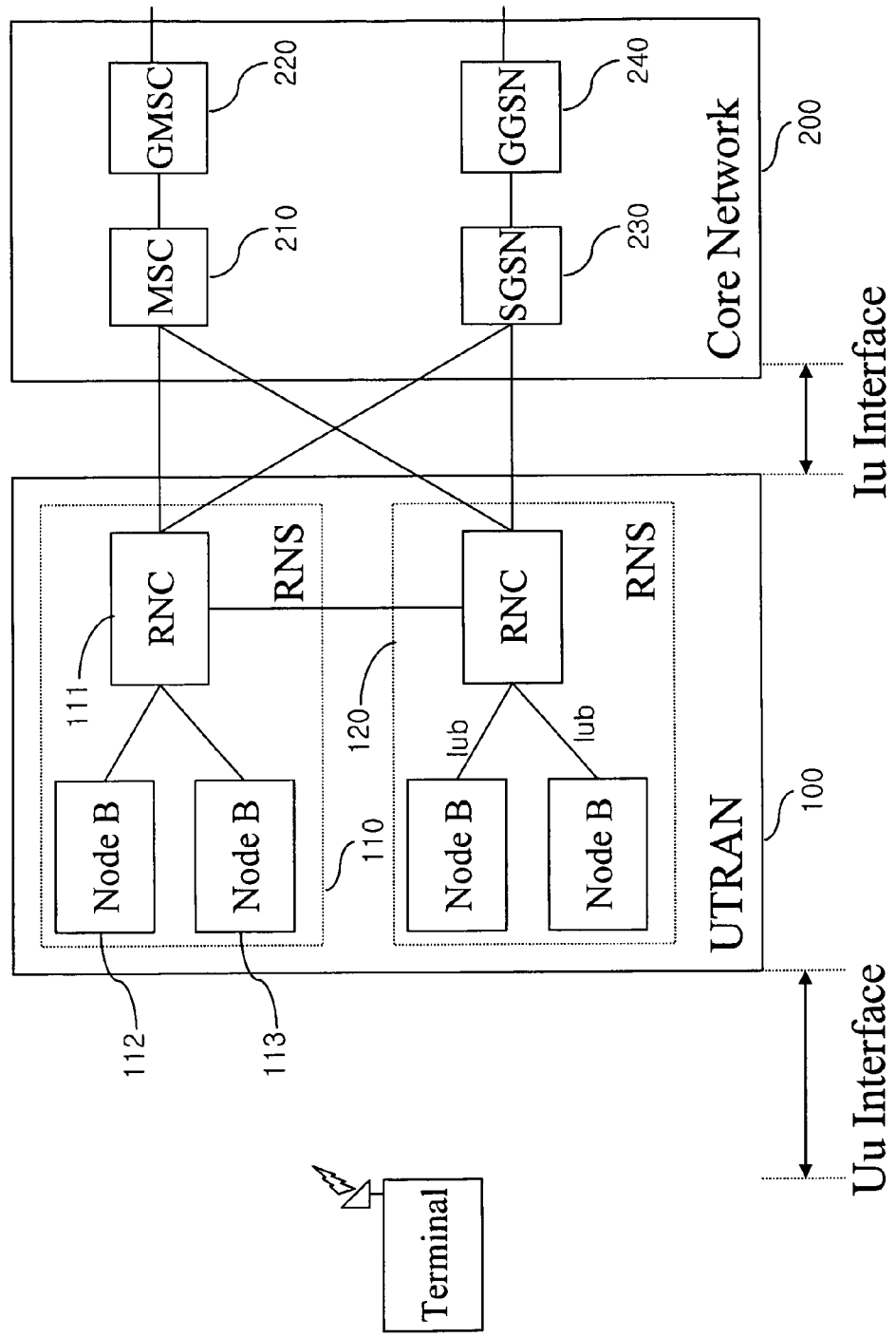
FIG. 1 illustrates a construction of a general UMTS network.
Figure 2:
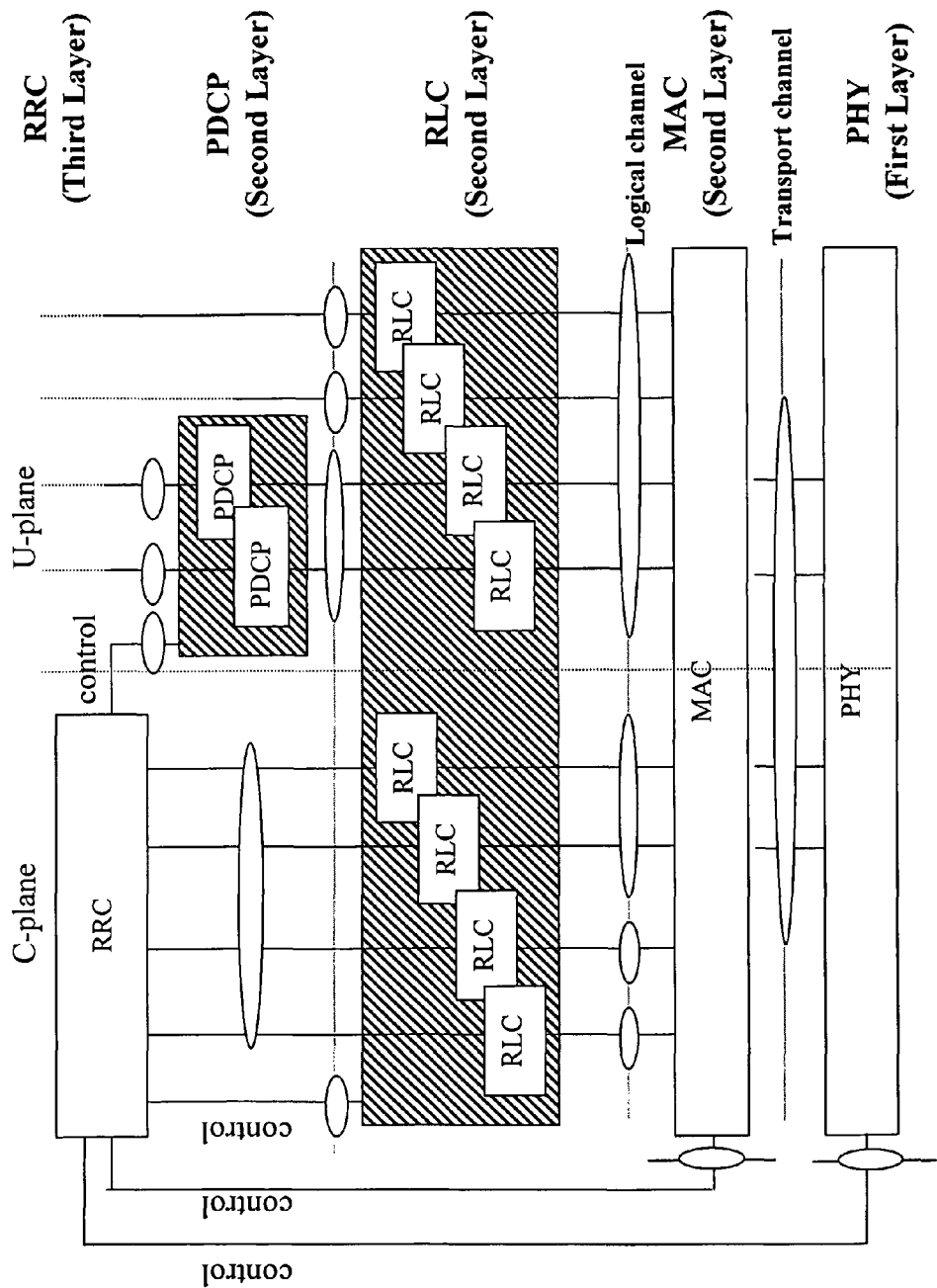
FIG. 2 illustrates a structure of a radio interface protocol between a terminal and UTRAN on the basis of 3GPP radio access network standards.
Figure 3:
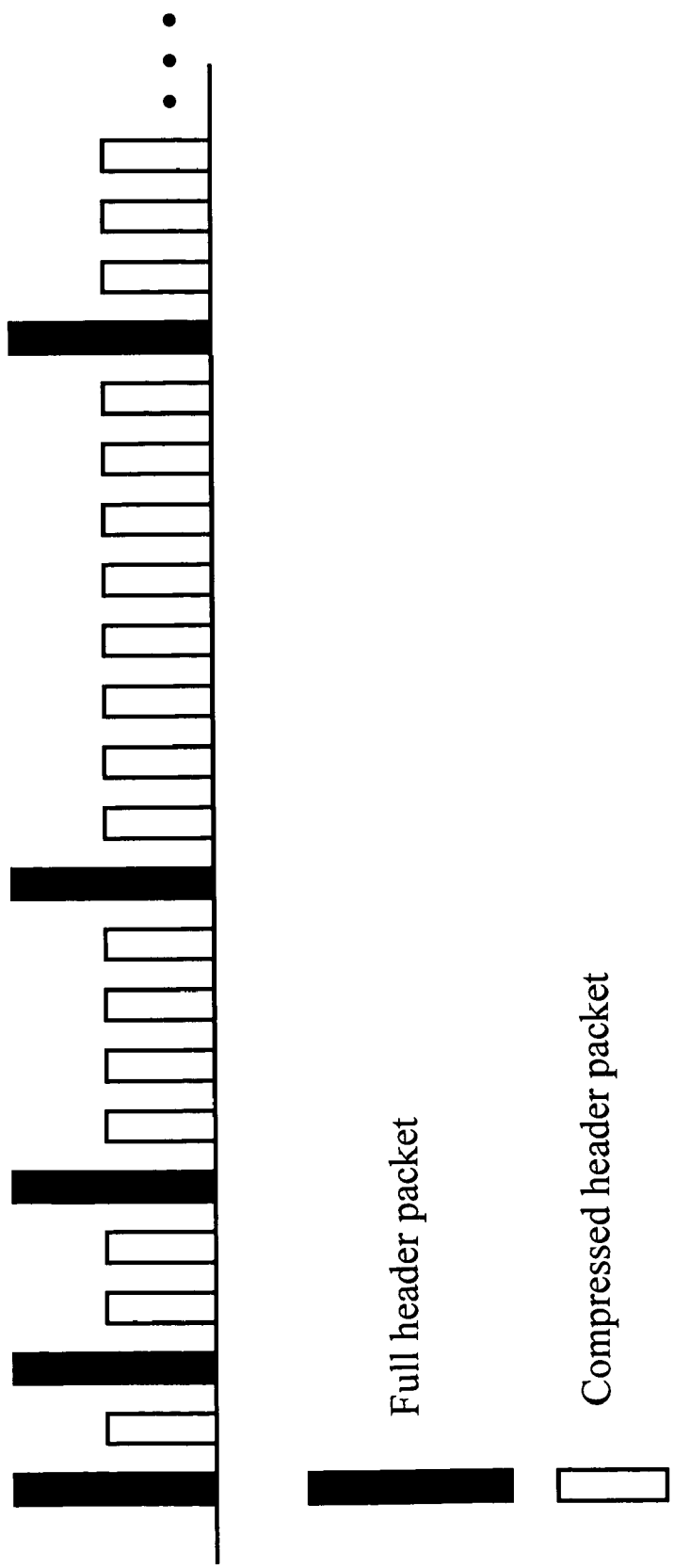
FIG. 3 illustrates a concept of a compression slow-start scheme.
Figure 4:
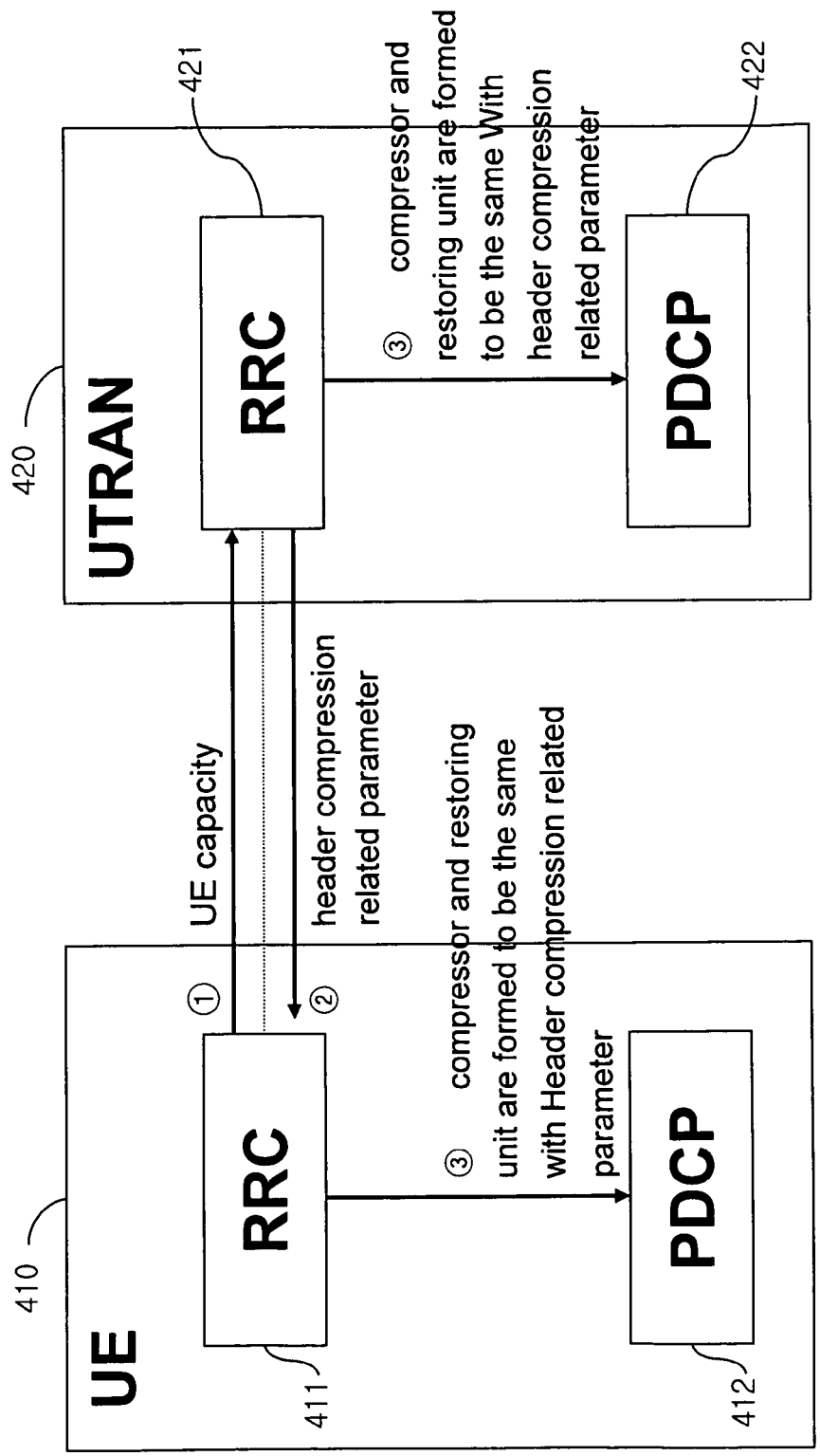
FIG. 4 is a signal flow chart for implementing a header compression scheme in accordance with a conventional art.
Figure 5:
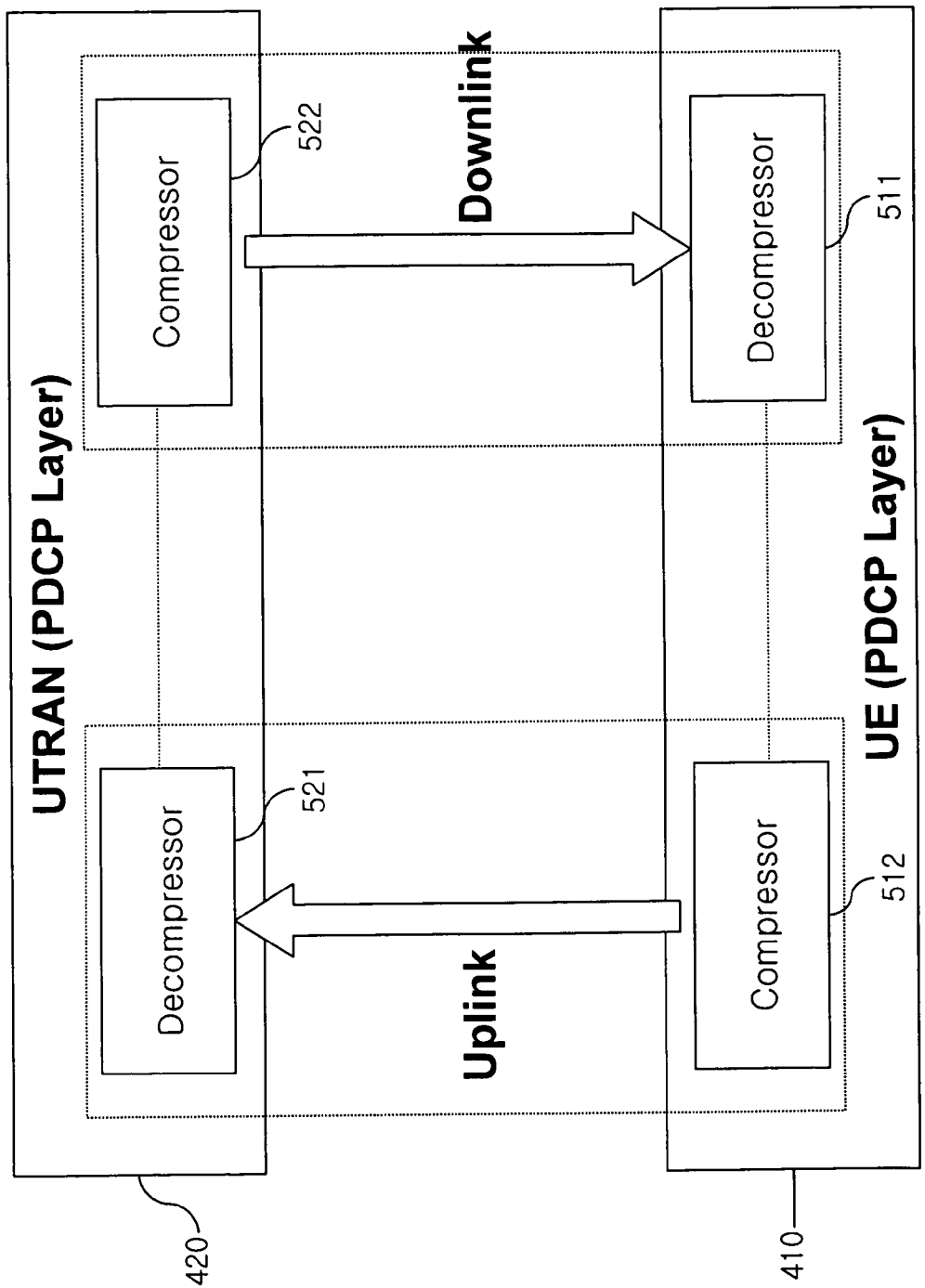
FIG. 5 illustrates structures of compressors and decompressors of a terminal and UTRAN in accordance with the conventional art.

As shown in FIG. 7, a compressor and a decompressor of the present invention have the same structures as those of the conventional art (refer to FIG. 5).

The only difference of the present invention from the conventional art is that UTRAN 620 and a terminal 610 allocate a memory resource required for a header compression scheme to the uplink and the downlink in consideration of transmission that the uplink and downlink are asymmetrical as well as the transmission that uplink and downlink are symmetrical.

Figure 6:
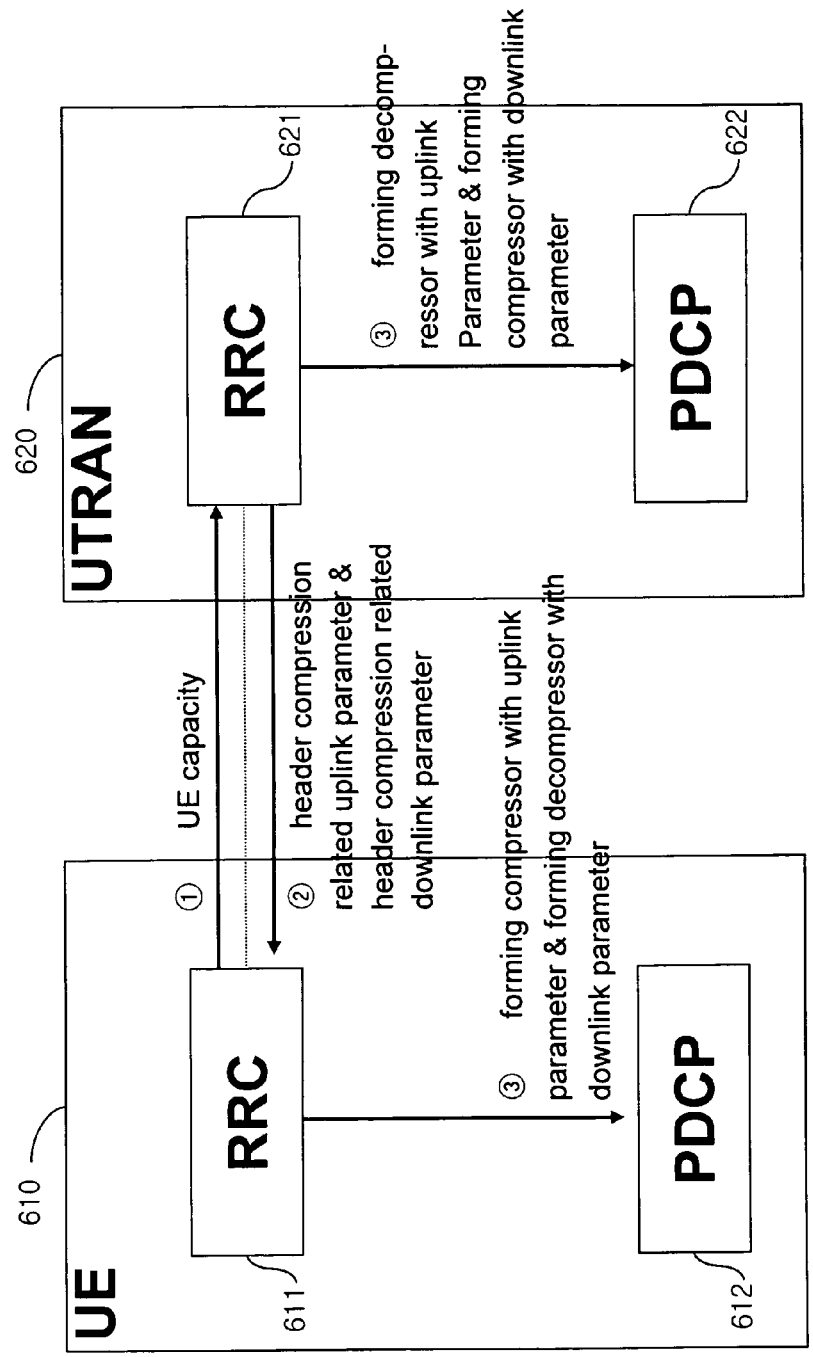
FIG. 6 is a signal flow chart for implementing a header compression scheme in accordance with a preferred embodiment of the present invention.

FIG. 6 is a signal flow chart for implementing a header compression scheme in accordance with a preferred embodiment of the present invention.

As shown in FIG. 6, a bi-directional packet data transmission system in accordance with a preferred embodiment of the present invention includes: UTRAN 620 for setting header compression-related parameter values required for uplink transmission and downlink transmission, and forming a compressor 722 and a decompressor 721; and a terminal 610 for transmitting the capacity information to UTRAN 620, receiving the set header compression-related parameter values from UTRAN 620 and forming a compressor 712 and a decompressor 711 by referring to the received parameter values.

UTRAN 620 includes an RRC layer 621 for setting the header compression-related parameter values required for uplink transmission and downlink transmission and transmitting the parameter values to an RRC layer 611 of the terminal and to its PDCP layer (622); and the PDCP layer 622 for forming the decompressor 721 used for uplink transmission and the compressor 722 used for downlink transmission, and performing a header compression and decompression.

The terminal 610 includes the RRC layer 611 for receiving the parameter values set by the RRC layer 621 of UTRAN 620 and transmitting the values to its PDCP layer 612; the PDCP layer 621 for forming the compressor 712 used for uplink transmission and the decompressor 711 used for downlink transmission by referring to the received parameter values, and performing header compression and decompression; and a first and second memory spaces for the uplink and downlink data transmissions, respectively. The two memory spaces may be independent of each other.

The operation of the packet data transmission system will now be described.

To begin with, the RRC layer 611 of the terminal 610 transfers the 'capacity information' to the RRC layer 621 of UTRAN 620.

Then, the RRC layer 621 of UTRAN 620 discriminates capacity information of uplink and capacity information of downlink from the received capacity information. Subsequently, the RRC layer sets parameter values for forming the compressor 712 and the decompressor 721 of the uplink by referring the uplink capacity information and also sets parameter values for forming the compressor 722 and the decompressor 711 of downlink by referring to the downlink capacity information.

The parameter values are not necessarily set on the basis of capacity information of the terminal. They can be set according to a statistical calculation value previously set in UTRAN 620.

After the parameter values are completely set, the RRC layer 621 of UTRAN 620 transfers the set parameter values to the RRC layer 611 of the terminal 610. The RCC layer 621 can transfer the set parameters for either the compressor only (uplink), the decompressor only (downlink), or both.

As the set parameter values transferred to the terminal 610, the RRC layer 611 of the terminal 610 and the RRC layer of UTRAN 620 transfers the set parameter values to the PDCP layers 612 and 622. Then, each header compression performing layer included in the PDCP layers 612 and 622 forms the compressors 712 and 722 and the decompressors 711 and 721 by referring to the parameter values.

Specifically, the header compression performing layer of UTRAN 620 forms the decompressor 721 used for uplink transmission and the compressor 722 used for downlink transmission by referring to the parameter values, and the header compression performing layer of the terminal 610 forms the compressor 712 used for uplink transmission and the decompressor 711 used for downlink transmission by referring to the parameter values.

And then, the header compression performing layers of the terminal 610 and UTRAN 620 perform header compression and decompression according to a certain header compression scheme by using the compressors 712 and 722 and the decompressors 711 and 721.

As described above, in the bi-directional packet data transmission system in accordance with the preferred embodiment of the present invention, the compressor 712 and the decompressor 711 of the terminal 610 (or the form of the compressor 722 and the decompressor 721 of UTRAN 620) are constructed in a different form so that the header compression-related memory resources allocated to the uplink and the downlink are set different. The forms of the compressor and the decompressors 712, 721, 722 and 711 which have peer-to-peer relations are the same with each other.

The bi-directional packet data transmission system in accordance with the present invention performs the header compression and decompression by adopting the RFC2507 header compression scheme or the ROHC scheme.

First, in the case of adopting the RFC2507 header compression scheme for the bi-directional packet data transmission system, the compressor 712 of the terminal 610 performing the uplink communication and the decompressor 721 of UTRAN 620 are formed by an F_MAX_PERIOD parameter informing of a transmission period of an full header packet with respect to the compression slow-start scheme, an F_MAX_TIME parameter informing of packet transmission available time, a MAX_HEADER parameter informing of the maximum compressible size of a header, a TCP_SPACE parameter informing of the maximum size of a TCP packet context, and a NON_TCP_SPACE parameter informing of the maximum size of non-TCP packet context.

The compressor 722 of UTRAN performing the downlink communication and the decompressor 711 of the terminal 610 are formed by a TCP_SPACE parameter informing of the maximum size of TCP packet context, a NON_TCP SPACE parameter informing of the maximum size of the non-TCP packet context, and an EXPECTED_REORDERING parameter informing of a re-sequential array of a reception packet.

Second, in the case of adopting the ROHC scheme for the bi-directional packet data transmission system, the compressor 712 of the terminal 610 performing the uplink communication and the decompressor 721 of UTRAN 620 are formed by a Max_CID parameter informing of the maximum number of contexts used for the header compression scheme, a profile parameter informing of a kind of an IP packet supportable by the decompressor, an MRRU parameter informing whether an IP packet can be segmented in the compressor, and a Packet_Sized_Allowed parameter determining sizes of compression header packets usable in the compressor.

In addition, the compressor 722 of UTRAN 620 performing the downlink communication and the decompressor 711 of the terminal 610 are formed by a Max_CID parameter informing of the maximum number of contexts, a profile parameter informing of a kind of an IP packet supported by the decompressor, an MRRU parameter informing of the maximum size of added packets when divided segments are added in the decompressor, and a Reverse_Decompression_Depth parameter informing of the maximum storage size of a buffer which stores a decompression-failed packet.

As so far described, the packet data transmission method and system of the present invention has the following advantages.

That is, because the memory resources are set to be different for the uplink and downlink transmission, waste of the memory resource can be prevented. In addition, the memory resource can be effectively managed even in a packet data transmission service (e.g., the streaming service) with the asymmetrical structure that the packet amount of the downlink is much greater than the packet amount of the uplink, or the packet amount of the uplink is much greater than the packet amount of the downlink.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of communicating a packet data in a wireless communication system, the method comprising:

transmitting, to a network, a request message including at least one of a first parameter indicating a string of bytes containing header information to be suppressed by the network and a second parameter indicating a total number of bytes in a header to be suppressed, wherein the header is included in data received from an upper layer;

receiving, from the network, a response message in response to the transmitted message, wherein the response message includes a third parameter indicating a payload header suppression index;

compressing the header included in the received data using the at least first, second, or third parameter; and delivering the compressed header to a lower layer, wherein the at least first, second, or third parameter is respectively applied to an uplink and to a downlink, and wherein the at least first, second, or third parameter that is applied to the uplink is different from the at least first, second, or third parameter that is applied to the downlink.

2. A method of communicating a packet data in a wireless communication system, the method comprising:

receiving, from a network, a request message including at least one of a first parameter indicating a string of bytes containing header information to be suppressed by the network and a second parameter indicating a total number of bytes in a header to be suppressed, wherein the header is included with data received from an upper layer; and transmitting, through the network, a response message in response to the received message, wherein the response message includes a third parameter indicating a payload header suppression index, wherein the header included in the received data was compressed using the at least first, second, or third parameter, wherein the compressed header is delivered to a lower layer, wherein the at least first, second, or third parameter is respectively applied to an uplink and to a downlink, and wherein the at least first, second, or third parameter that is applied to the uplink is different from the at least first, second, or third parameter that is applied to the downlink.

* * * * *